(12) United States Patent
Dunlap et al.

(10) Patent No.: US 8,714,322 B2
(45) Date of Patent: May 6, 2014

(54) HYDRAULIC BRAKE MECHANISM

(75) Inventors: Charles E. Dunlap, Manitou Springs, CO (US); Paul Feuerstein, Brookfield, IL (US)

(73) Assignee: SRAM, LLC, Chicago, IL (US)

( * ) Notice: Subject to any disclaimer, the term of this patent is extended or adjusted under 35 U.S.C. 154(b) by 89 days.

(21) Appl. No.: 13/351,000

(22) Filed: Jan. 16, 2012

(65) Prior Publication Data

US 2013/0180815 A1 Jul. 18, 2013

(51) Int. Cl.
*B62L 5/00* (2006.01)
*B60T 11/26* (2006.01)

(52) U.S. Cl.
USPC .......................................... 188/344

(58) Field of Classification Search
USPC ........ 188/24.11, 24.22, 26, 344, 352; 74/488, 74/489; 60/585, 588
See application file for complete search history.

(56) References Cited

U.S. PATENT DOCUMENTS

| | | | | |
|---|---|---|---|---|
| 6,003,639 | A * | 12/1999 | Buckley et al. | 188/26 |
| 2008/0155982 | A1* | 7/2008 | Jones et al. | 60/588 |
| 2008/0302101 | A1* | 12/2008 | Dunlap | 60/594 |
| 2009/0000878 | A1* | 1/2009 | Lumpkin | 188/24.22 |
| 2011/0031079 | A1* | 2/2011 | Matsushita | 188/344 |
| 2012/0096850 | A1* | 4/2012 | Dunlap et al. | 60/585 |

* cited by examiner

*Primary Examiner* — Christopher Schwartz
(74) *Attorney, Agent, or Firm* — Milan Milosevic; Lisa Serdynski; Steven Courtright

(57) ABSTRACT

A hydraulic brake mechanism is described including a housing. A master cylinder assembly is disposed within the housing, and the master cylinder assembly includes a fluid chamber. The fluid chamber includes a first chamber portion having a first diameter and a second chamber portion having a second diameter, with the first diameter greater than the second diameter. The fluid chamber includes a transition region between the first and second chamber portions. The mechanism includes a piston assembly having a piston disposed within the fluid chamber. A first seal is configured to sealingly engage between the first chamber portion and the piston, and a second seal is configured to sealingly engage between the second chamber portion and the piston. The mechanism includes an outlet port extending from the fluid chamber from or adjacent the transition region.

29 Claims, 16 Drawing Sheets

HYDRAULIC BRAKE MECHANISM

BACKGROUND OF THE INVENTION

The invention relates to a hydraulic brake system. More particularly, the invention relates to a hydraulic brake actuation mechanism used with a hydraulic brake for engaging a wheel of a vehicle, such as for example, a bicycle.

Many vehicles, such as for example bicycles, utilize a hydraulic brake system that applies pressure to a rotating wheel, or a disc mounted to a rotating wheel. Some of these braking systems utilize a mechanism including a hand lever, to generate pressure in a hydraulic fluid. This pressure is transferred through a hydraulic line or conduit to a brake assembly, which may include a caliper having pads, such that the hydraulic pressure is applied to the pads to squeeze the pads against the rotating part to impart a braking force.

SUMMARY OF THE INVENTION

In light of the present need for an improved hydraulic brake actuation mechanism, and in particular a mechanism that is provided in an overall ergonomic package, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

In one aspect of some embodiments of the invention a hydraulic brake mechanism mountable to a handlebar is described where the brake mechanism includes a housing mountable to the handlebar. A master cylinder is disposed within the housing, and the master cylinder assembly includes a fluid chamber. The fluid chamber includes a first chamber portion having a first diameter and a second chamber portion having a second diameter, with the first diameter greater than the second diameter. The fluid chamber includes a transition region between the first and second chamber portions. The mechanism includes a piston assembly having a piston disposed within the fluid chamber. A first seal is configured to sealingly engage between the first chamber portion and the piston, and a second seal is configured to sealingly engage between the second chamber portion and the piston. The mechanism includes an outlet port extending from the fluid chamber from at or adjacent the transition region, or in other words, from at least one of the transition region, the first chamber portion and a proximate portion of the second chamber portion.

BRIEF DESCRIPTION OF THE DRAWINGS

In order to better understand various exemplary embodiments, reference is made to the accompanying drawings, wherein.

DETAILED DESCRIPTION

Figure 1:
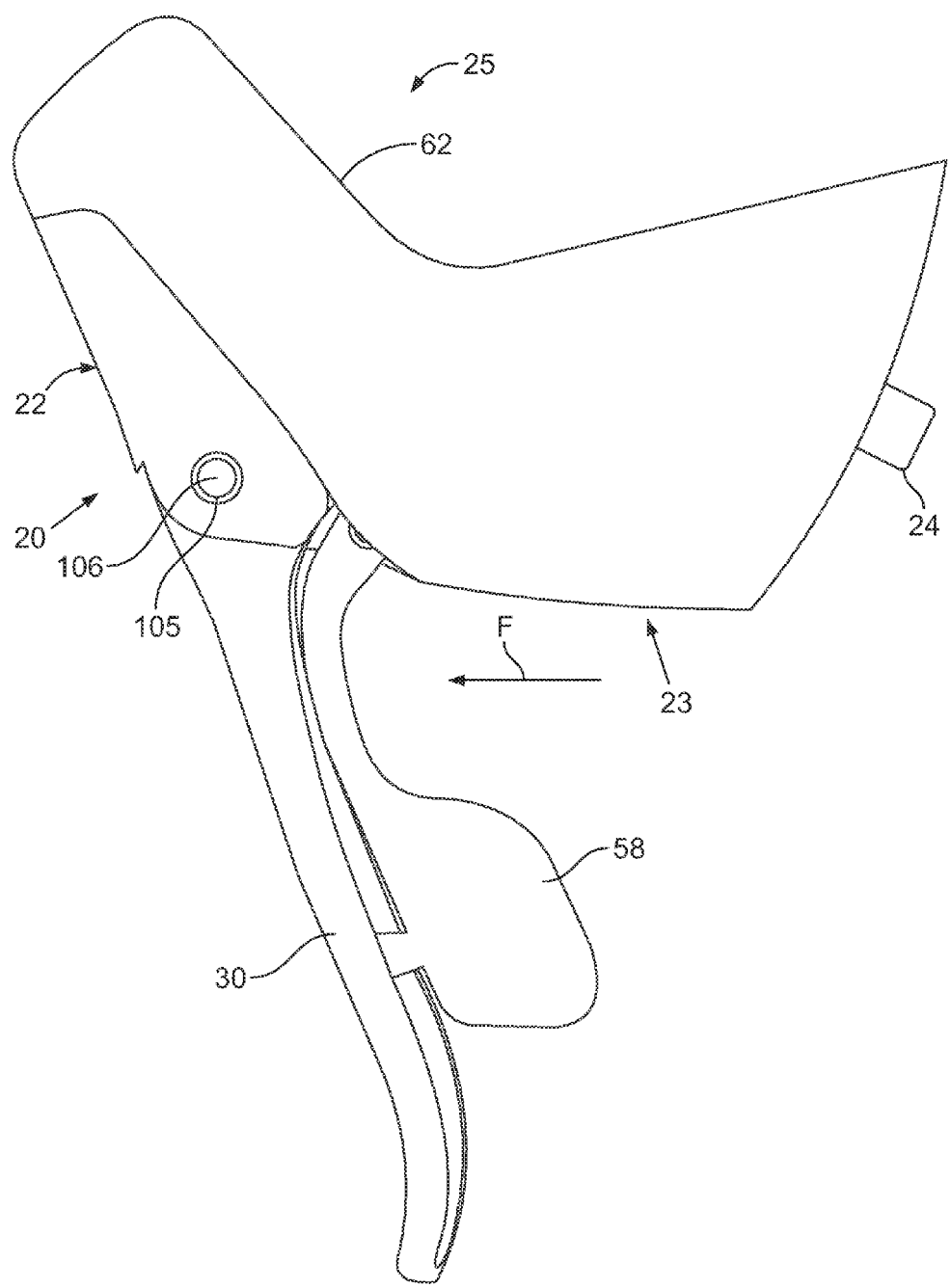
FIG. 1 is a side view of a brake hood including a brake actuation mechanism and a shift actuation mechanism according to an embodiment of the invention.
Figure 2:
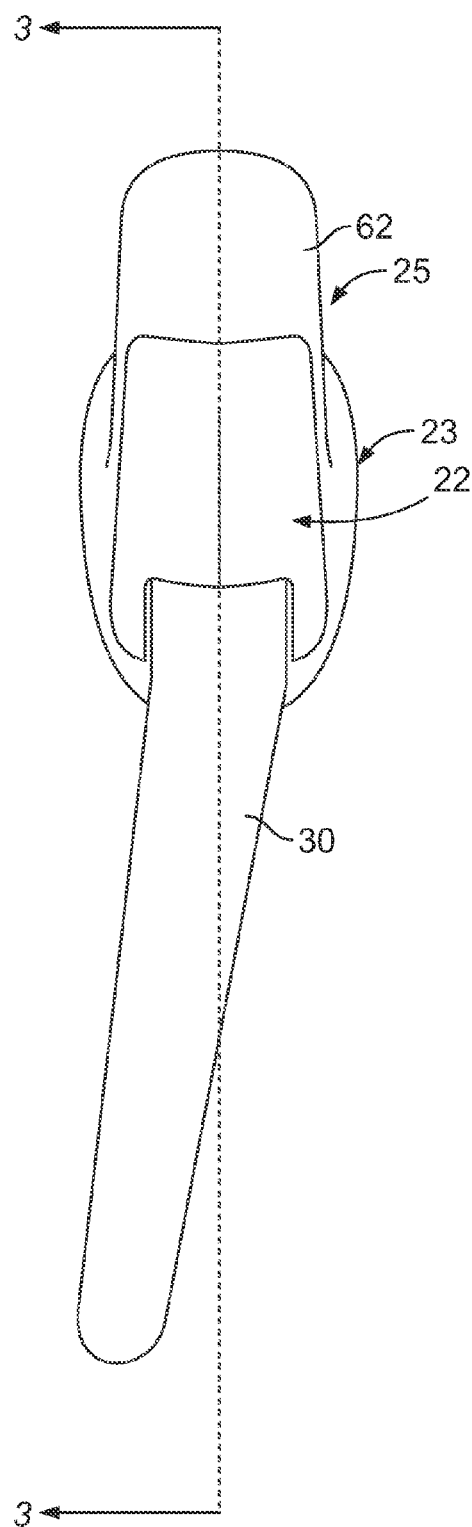
FIG. 2 is a front view of the mechanism of FIG. 1, showing a brake lever and hood.
Figure 3:
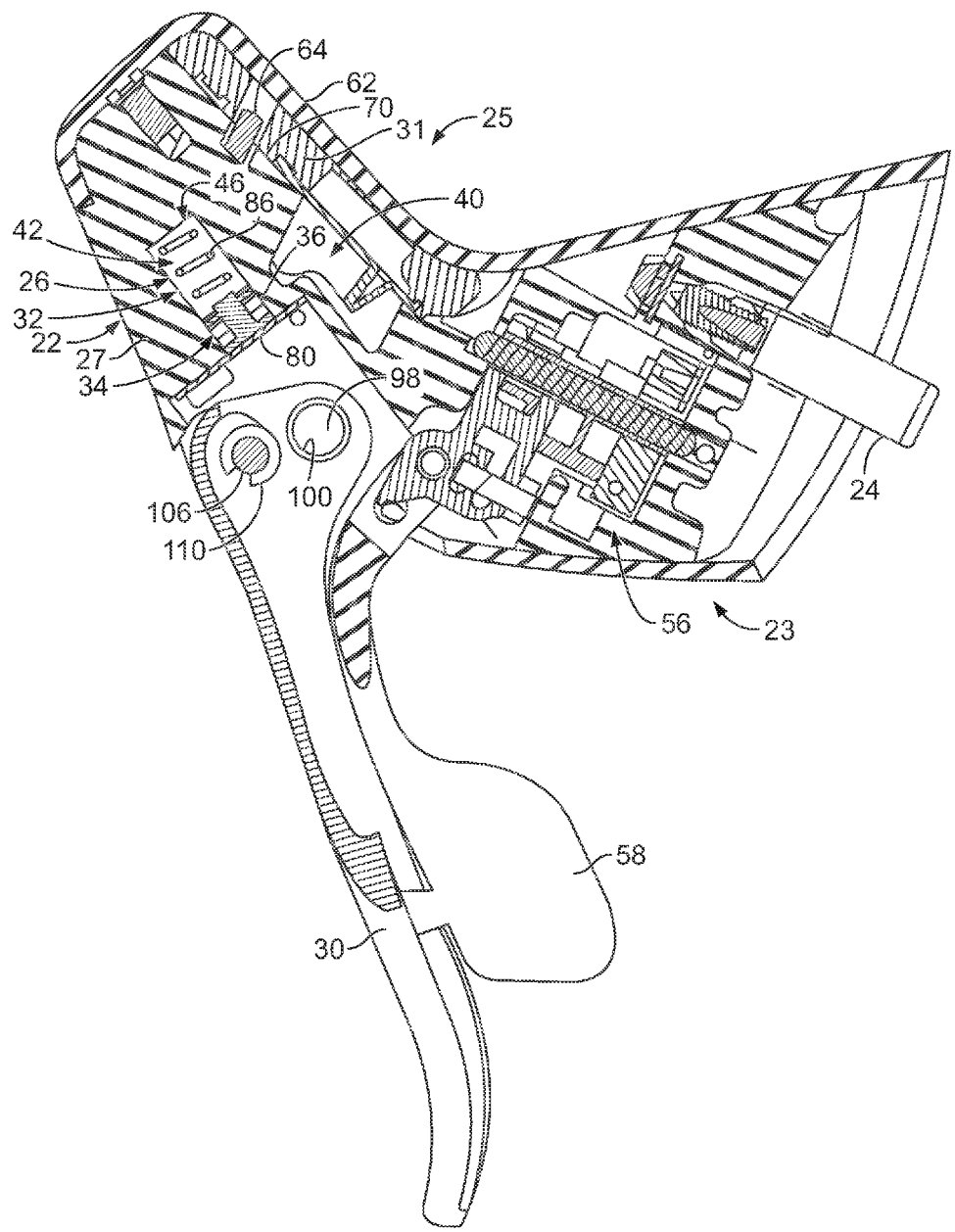
FIG. 3 is a cross-sectional view through lines 3-3 of the mechanism of FIG. 2.
Figure 4:
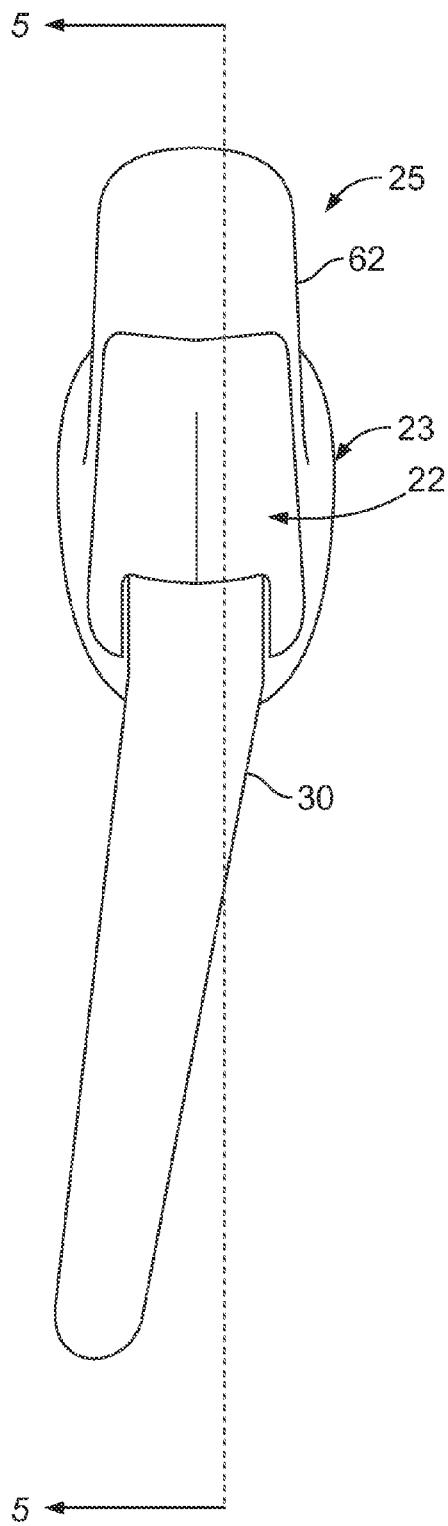
FIG. 4 is a front view of the mechanism of FIG. 1, showing a brake lever and hood.

Various embodiments of the invention provide for a hydraulic brake actuation mechanism, which may in some cases include another component such as, for example, a shift actuation mechanism. The mechanism described herein is well suited for use in handlebar-steered vehicles such as, for example, bicycles. It will be understood that the positional/directional references will be used herein according to their ordinary meaning unless specifically set out hereinbelow, with the hydraulic brake actuation mechanism of the invention mounted to a vehicle, and wherein the vehicle is oriented according to normal use. One embodiment will now be described further below, with reference to the drawing figures.

Referring to FIGS. 1-15, a hydraulic brake actuation mechanism 20 for a handlebar-steered vehicle, according to the invention, includes a housing 22. The housing 22 may be made of any suitable material, for example: aluminum, plastic, composites, and/or carbon fiber. A master cylinder assembly 26 is disposed at least partially within the housing 22. An actuator, which may be in the form of a brake lever 30 is pivotally attached to the housing 22 and is operably connected to the master cylinder assembly 26. A shift mechanism 56 may be positioned in or on the housing 22. The shift actuation mechanism 56 may be attached to or disposed within the housing 22, as is known in the art, and is actuated by a shift lever 58 or other shift mechanisms such as one or more switches, such that both braking and shifting operations can be performed while the user grasps the housing 22, and thus maintains contact and control of the vehicle while braking and/or shifting. In one example, the shift actuation mechanism may be a control mechanism such as that described in U.S. Pat. No. 7,779,718.

Generally, the housing 22 may be considered to include a housing body 27. The housing body 27 is a single-piece molded construction or formed of more than one piece. The housing body 27 may be considered to include a base portion 23 and an extension portion 25. The housing 22 is mountable to a part of the handlebar-steered vehicle, for example by a clamp 24 attached to the base portion 23 of the housing body 27. The housing 22 may be arranged on a handlebar of the vehicle pointing in the forward direction, i.e., pointing in the forward travel direction (F) of the vehicle during normal use, oriented generally along the longitudinal axis of the vehicle, with the base portion 23 generally aligned horizontally and the extension portion 25 generally forward of the base portion and angled generally upwardly from the base portion when mounted.

The housing 22 also may include a first cover part 29 that closes the housing body 27 on at least one flank or lateral side thereof and a second cover part 31 that closes the housing body on a top or upper side thereof. The first cover 29 permits access to the interior of the housing body 27 for installation, removal, and maintenance of elements of the hydraulic brake actuation mechanism 20 that are reachable through the side of the housing body. The first cover 29 may also cover part of the top surface 70 of the housing body 27 (FIG. 6) and cooperate with the second cover 31, and housing body to present a smooth, comfortable shape for a user's hand while covering elements of the interior mechanism.

The second cover part 31 permits access to the interior of the housing body 27 for installation, removal, and maintenance of elements of the hydraulic brake actuation mechanism 20 that are reachable at or through the top of the housing body. The covers 29, 31 also may complete an ergonomic shape with the housing body 27, and when assembled to form the housing 22 may receive a hood cover 62, which may be an elastomeric material.

The hydraulic brake actuation mechanism 20 includes a master cylinder assembly 26 which may be disposed within the housing body 27 and may be disposed in the extension portion 25. The master cylinder assembly 26 may be generally oriented along the longitudinal axis of the extension portion 25, as will be seen in more detail hereinbelow. It will be understood that the master cylinder assembly 26 is connectable to a conventional slave cylinder (not shown) by a hydraulic line or conduit 28 which provides fluid communication therebetween.

Figure 6:
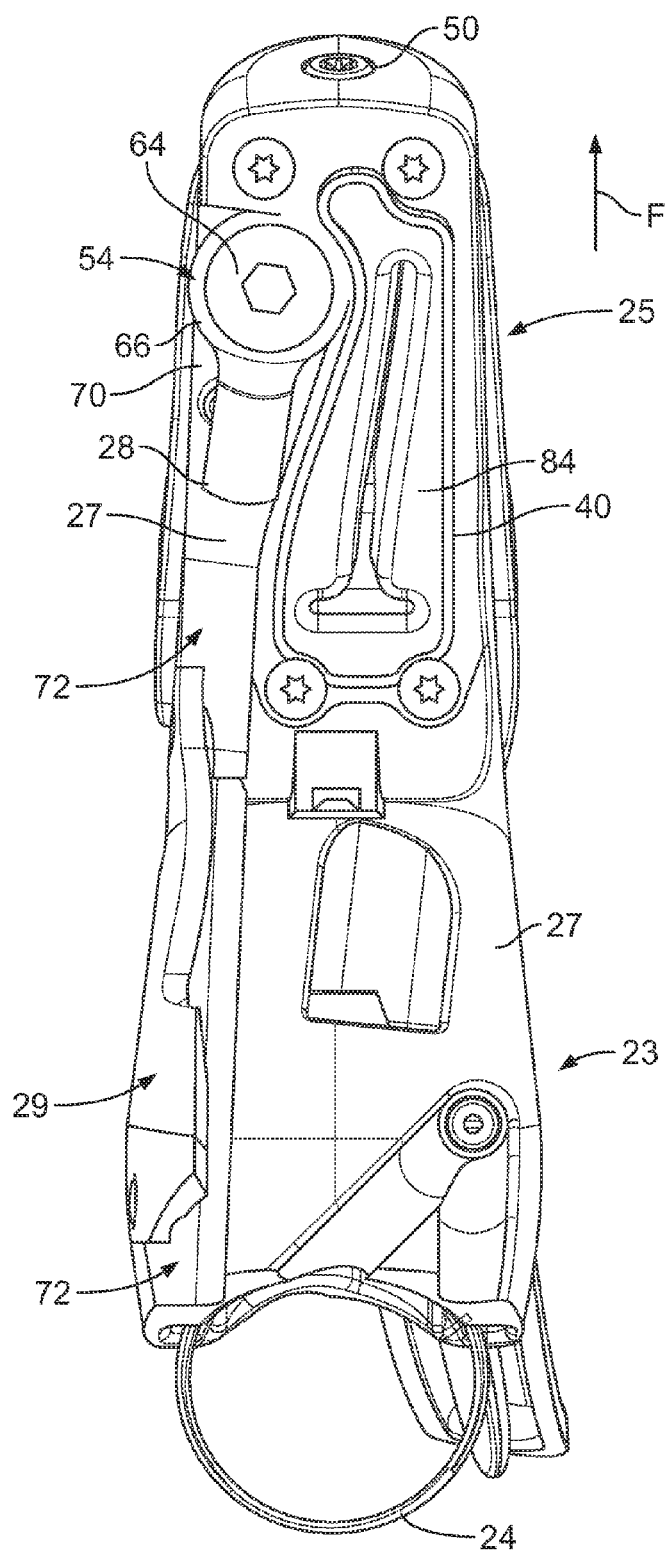
FIG. 6 is a top view of a second embodiment of a brake actuation mechanism according to the invention, with part of the housing removed to reveal the arrangement of elements at or near the top of the brake actuation mechanism.
Figure 7:
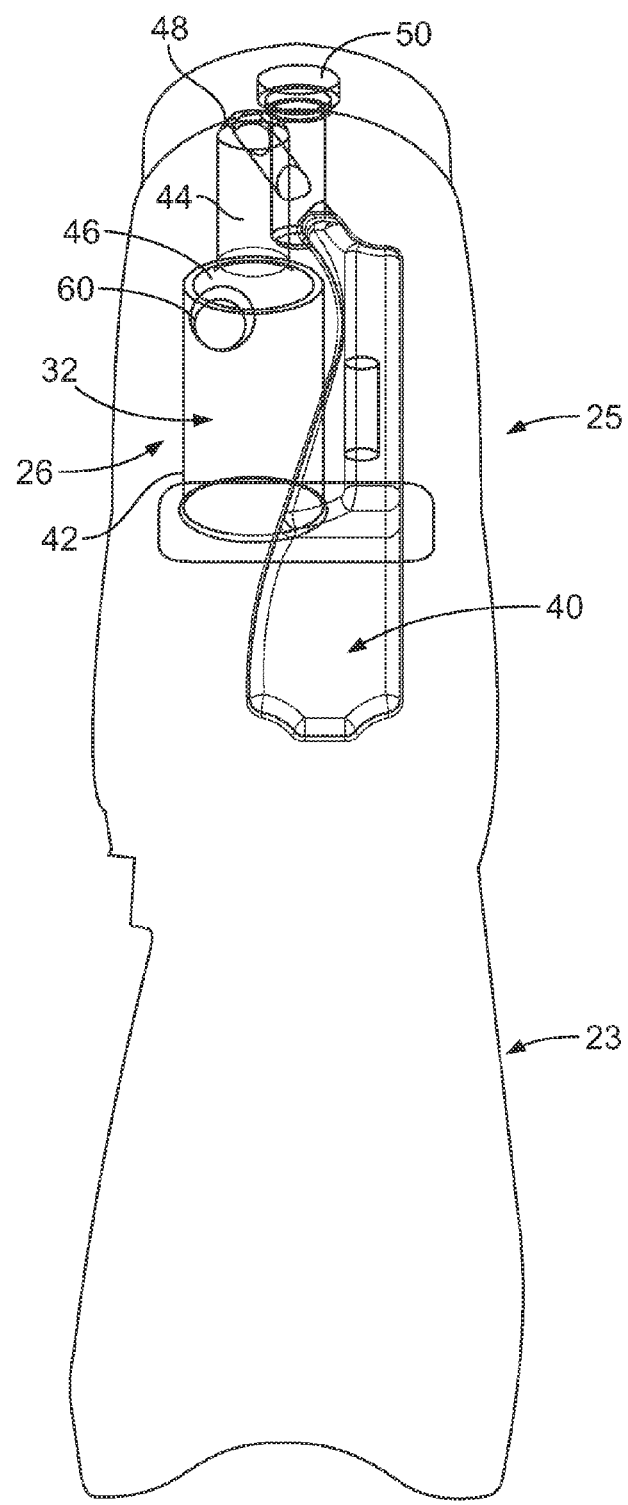
FIG. 7 is a top view of the brake actuation mechanism of FIG. 6, showing internal structure.

As shown in FIG. 6, the master cylinder assembly 26 includes a fluid chamber 32 that is formed within the housing body 27 and a piston assembly 34 that is reciprocally disposed within the fluid pressure chamber. The fluid chamber 32 includes first and second chamber portions 42, 44 and a transition region 46 located therebetween.

Figure 9:
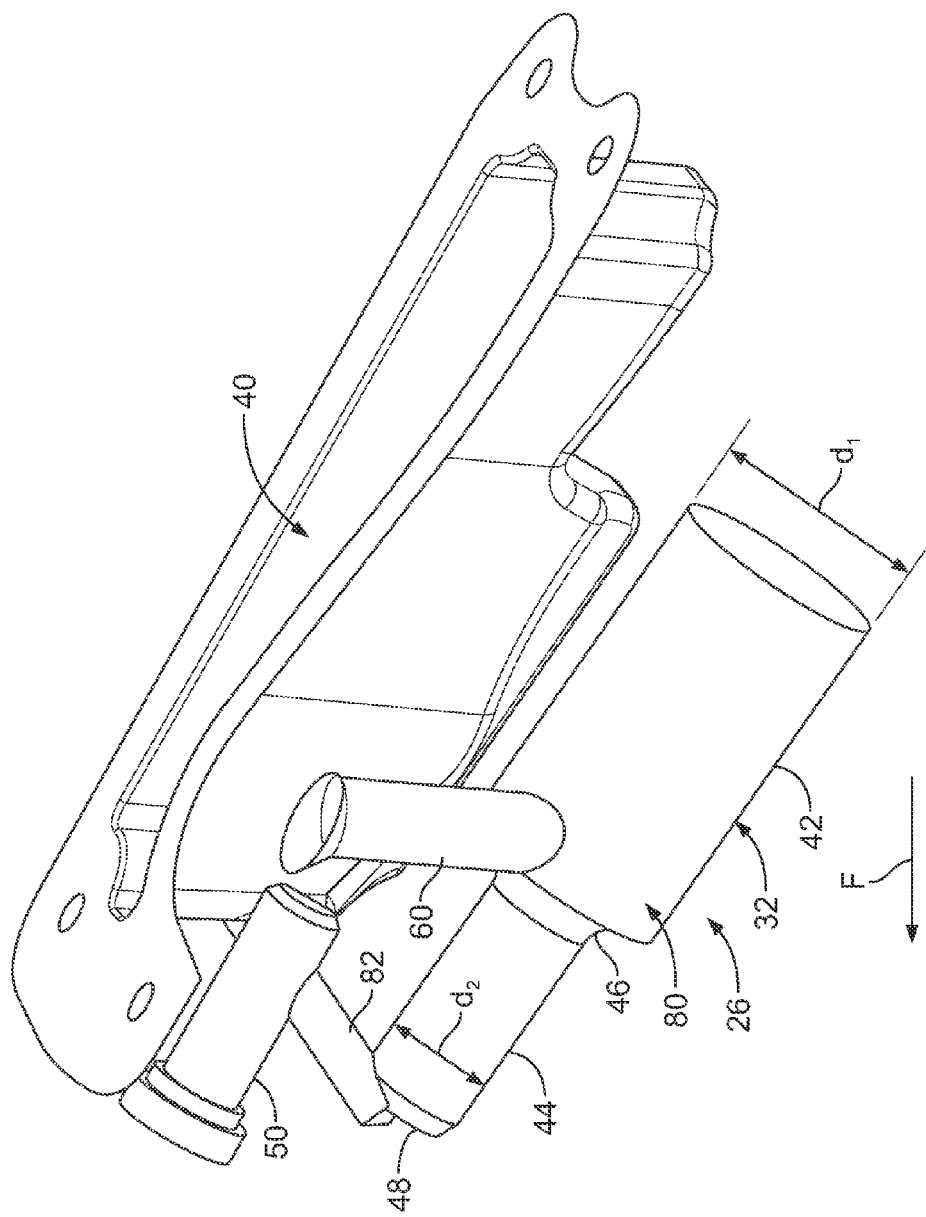
FIG. 9 is a partial isometric view of the internal chambers and passageways of the brake actuation mechanism of FIG. 6.
Figure 10:
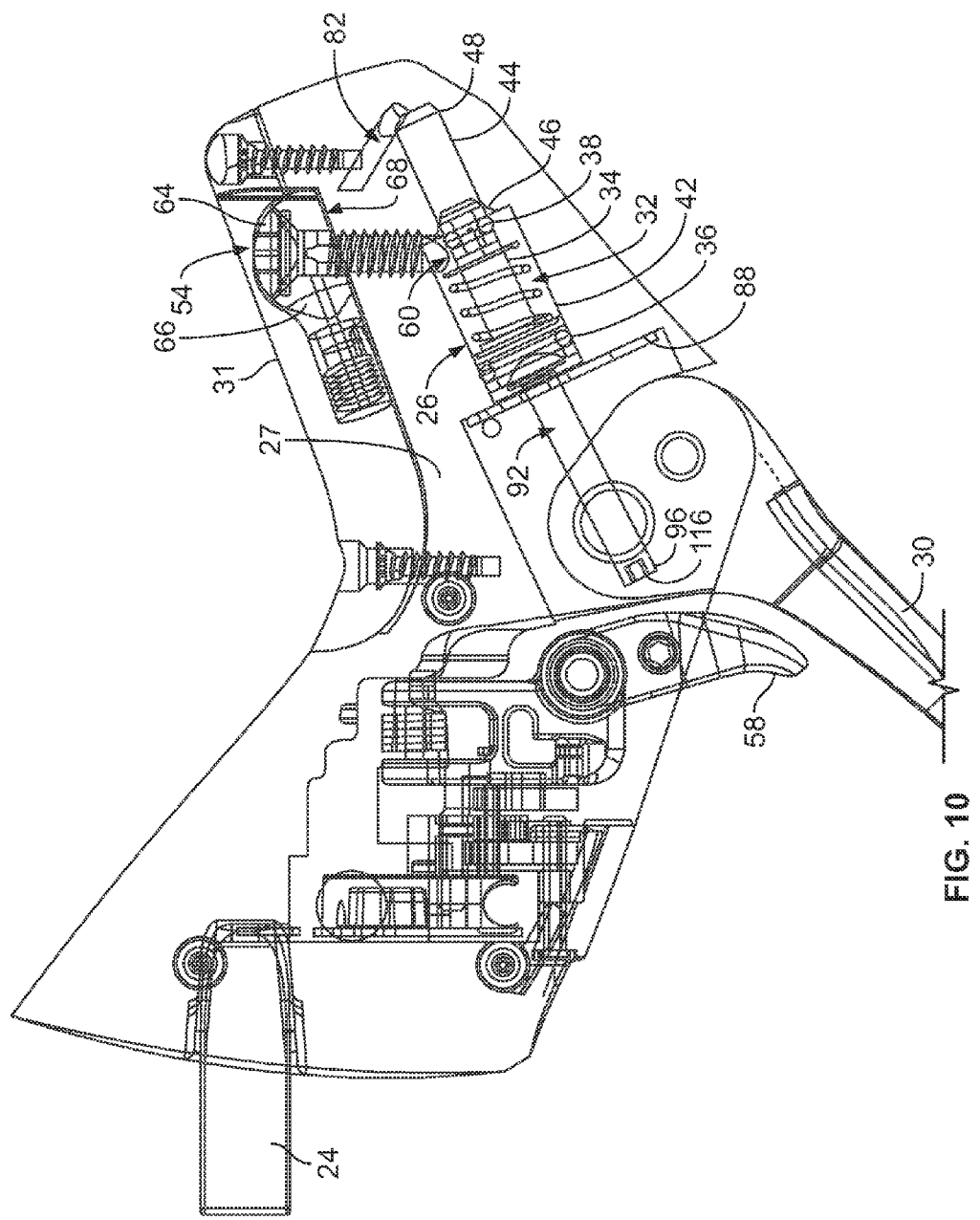
FIG. 10 is a side view of the brake actuation mechanism of FIG. 6, showing internal structure.

In the embodiment shown in FIG. 9, the first chamber portion 42 has a greater cross-sectional area or diameter ($d_1$) than a cross-sectional area or diameter ($d_2$) of the second chamber portion 44. In this embodiment, the transition region 46 is tapered but may have a different shape or may be eliminated entirely, for example, by a stepped transition between first and second chamber portions 42, 44. The first and second chamber portions 42, 44 in this embodiment are cylindrical; however, the portions may take a variety of shapes. It will be understood that the shape of the first and second chamber portions 42, 44 will be matched in shape by the relevant parts of the piston assembly 34 and any seals functioning therebetween.

One end 48 of the second chamber portion 44, i.e. a distal end, is directly or indirectly in fluid communication with a bleed or fill port 50 formed in the housing 22. A bleed port screw 52 is removably disposed in the bleed port 50 to permit bleeding of air or the addition of fluid. The bleed port screw 52 is provided with a seal 53, which is for example an O-ring. The end 48 is also directly or indirectly in fluid communication with a fluid reservoir 40 formed in the housing body 27, for example, by way of a passageway 82 that may interconnect the bleed port 50 and the fluid reservoir.

Figure 8:
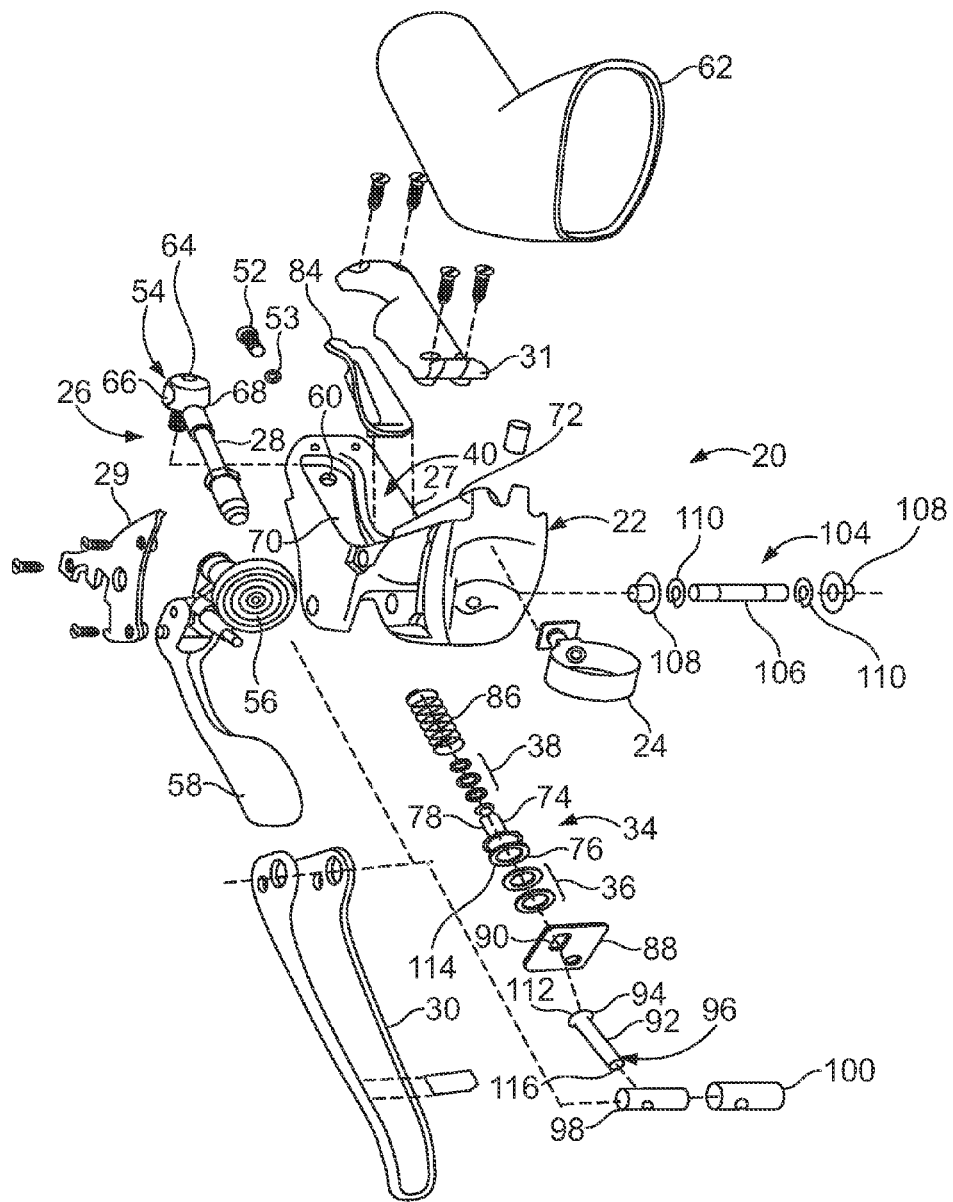
FIG. 8 is an exploded isometric view of the brake hood and mechanism of FIG. 1.

The reservoir 40 is capped by a bladder 84, in a known fashion (FIG. 8). In order to provide an ergonomic overall shape to the housing 22, and provide sufficient brake fluid volume for the hydraulic brake actuation mechanism 20, the reservoir 40 may be positioned along the side of the fluid chamber 32, and may extend vertically both above and below the fluid pressure chamber, with the housing mounted to a drop handlebar, for example. In other words, when the hydraulic brake actuation mechanism 20 is mounted for use on a vehicle, the reservoir 40 may be positioned in a side-by-side configuration with the fluid chamber 32, and has a shape and size that extends both vertically above and below the fluid pressure chamber.

Figure 11:
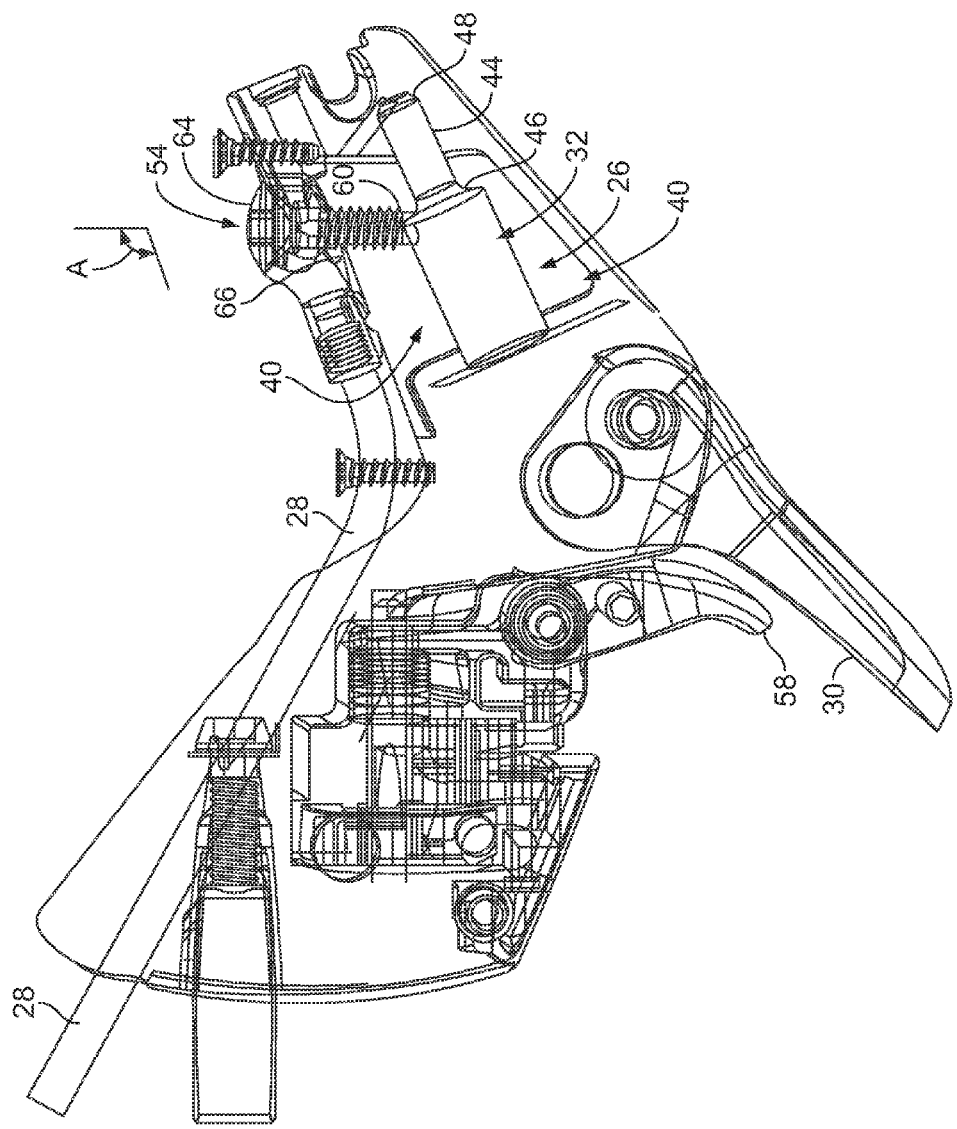
FIG. 11 is a side view of the brake actuation mechanism of FIG. 10, showing internal structure.
Figure 12:
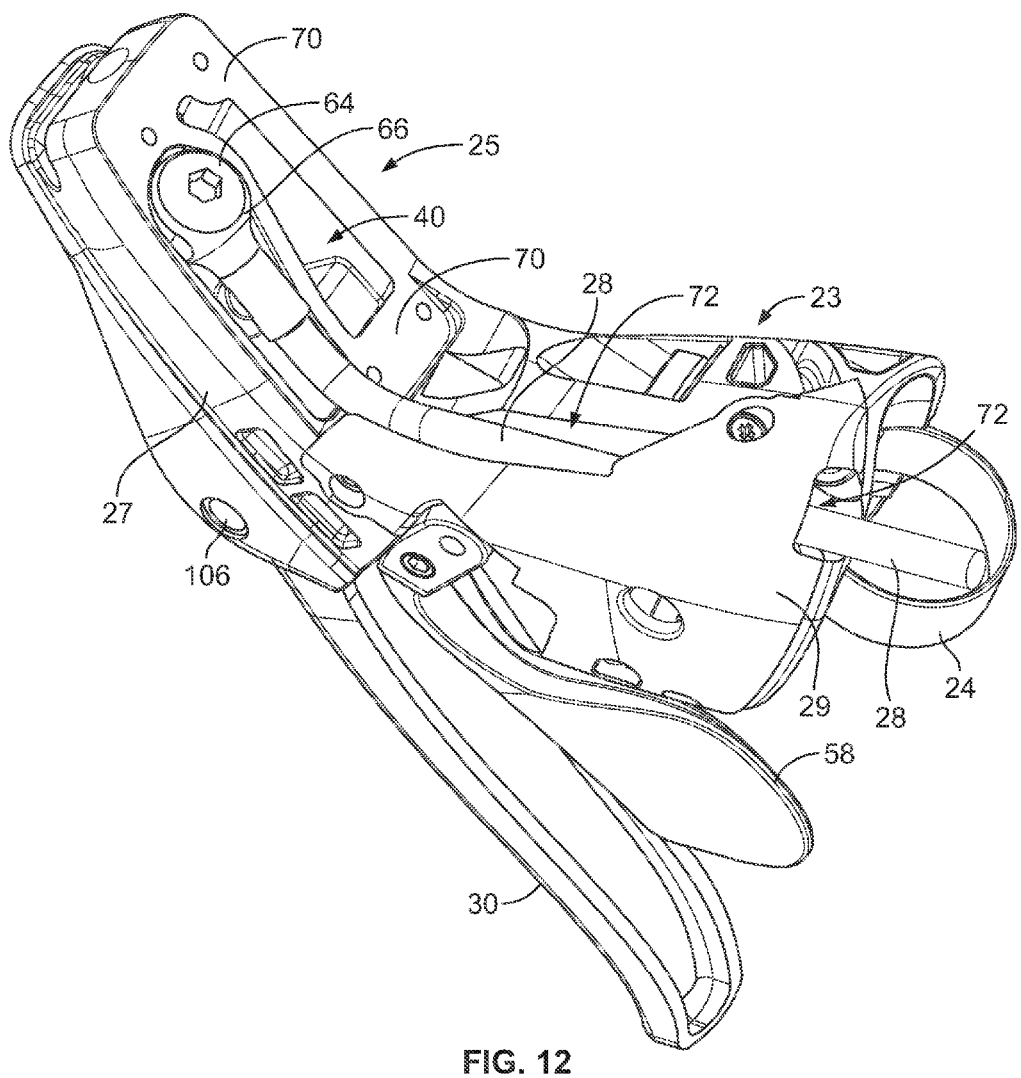
FIG. 12 is a perspective view of the brake actuation mechanism, showing the top and a side of the brake hood.

A fluid outlet port 60 is formed in the housing body 27 connecting the fluid chamber 32, in the vicinity of the transition region 46, to a fluid fitting assembly 54. The fluid fitting assembly 54 includes a hollow bolt 64 which is in fluid communication with the fluid outlet port 60, for example—threadably inserted into the fluid output port. The fluid fitting assembly 54 includes a "banjo" fitting 66, connected to and in fluid communication with the hollow bolt 64. The banjo fitting 66 is similar to conventional banjo fittings, except the bottom surface 68 of the banjo fitting is not oriented normal to the axis of the hollow bolt. In the illustrated embodiment, the angle (A) of the hollow bolt 64 (and the fluid outlet port 60) is greater than 90 degrees, angled relative to the top or upper surface 70 of the housing 22 (FIG. 11). Therefore, in order for the banjo fitting 66 to lie flush on the surface 70 of the housing, the invention contemplates a banjo fitting that has been modified by orienting the bottom surface 68 of the fitting to match the top surface or upper surface 70 of the housing body 27.

Due at least in part to the construction of the fluid fitting assembly 54, the housing body 27 can closely accommodate the fitting 54, and hydraulic line 28 attached thereto, in such a way that the hydraulic line can lie parallel to the surface 70, and thus presents a low profile that permits the housing 22 to be designed ergonomically. Because of the low profile configuration, the hood cover 62 can be smoothly fitted over the housing 22, including the fluid fitting assembly 54 and hydraulic line 28, and thus the fit of hood cover and the overall shape is not interrupted or negatively affected by any projecting hydraulic lines or elements.

The housing body 27 additionally may have a groove 72 that generally runs along the length of the housing that accommodates the hydraulic line 28 such that a smooth contour is presented that conforms to the hand of the user. In the illustrated embodiment, the groove 72 is formed at or near the junction of the top surface and side surface of the housing body 27. Other positions of the groove 72 may be possible, such as along the side of the housing body 27. With respect to ergonomics, the first cover part 29 may be configured to wrap over the hydraulic line 28 and at least partially enclose the groove 72.

The piston assembly 34 includes a piston 74 reciprocally disposed within the fluid chamber 32. The piston 74 has first and second portions 76, 78. A first seal 36, in this embodiment, a combination of a glide ring and an O-ring, is disposed on the first portion 76 of the piston 74 and a second seal 38 is disposed on the second portion 78 of the piston 74. Other types of suitable seals are contemplated. In an alternative embodiment, the seals 36, 38 may be positioned in the walls of the fluid chamber 32, and contact the piston 74.

Figure 5:
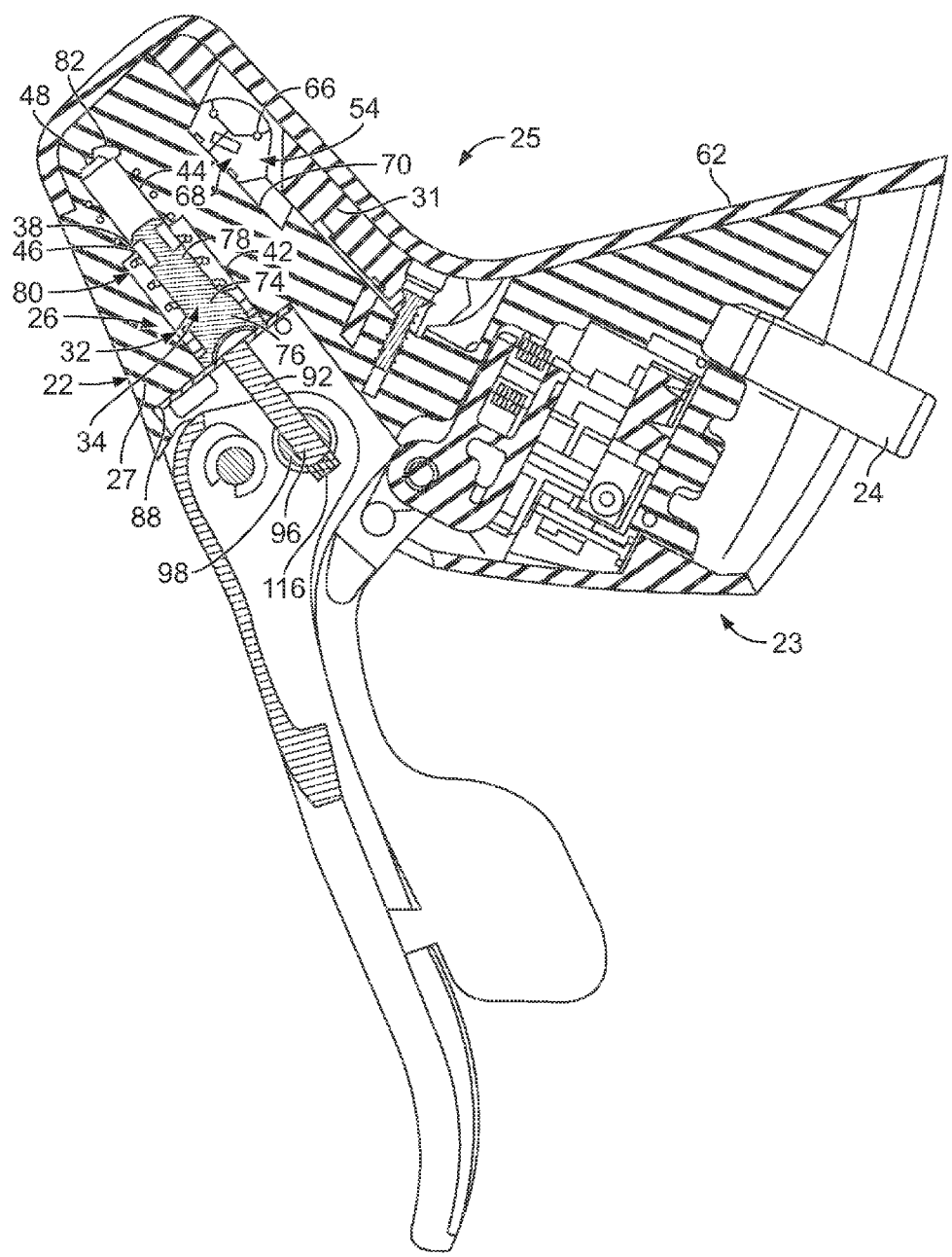
FIG. 5 is a cross-sectional view through lines 5-5 of the mechanism of FIG. 2.

The first and second portions 76, 78 carrying respective first and second seals 36, 38 are configured to sealingly engage respective first and second chamber portions 42, 44 of the fluid chamber 32. When so engaged, first and second seals 36, 38 define an output chamber 80 therebetween (FIG. 5). The fluid outlet port 60 may extend from the output chamber 80 in the vicinity of the transition region 46 (FIG. 9).

The piston 74 is slidably displaceable between an open fluid circuit position that permits fluid flow between the first and second chamber portions 42, 44 of the fluid chamber 32 and a closed fluid circuit position (FIG. 5) that blocks fluid flow between the first and second chamber portions 42, 44. When the piston 74 creates the closed circuit position, i.e., when both first and second seals 36, 38 are engaged with respective first and second chamber portions 42, 44 of the fluid chamber 32, the act of advancing the piston (into the fluid pressure chamber) causes fluid pressure to build in the output chamber 80 because of the reduction in volume caused by the advancing piston. The increase of fluid pressure in the output chamber 80 causes fluid to be forced from the chamber and through the fluid outlet port 60. Due to the configuration of the fluid chamber 32 it can be seen that the fluid outlet port 60 may be positioned in fluid communication with the output chamber 80 in the vicinity of the transition region 46. Accordingly, the fluid outlet port 60 may extend from the fluid chamber 32 at or near the transition region 46 or the first chamber portion 42 of the fluid pressure chamber, although an amount of fluid connection with some of the second chamber portion 44, particularly at or near the transition region may also be effective as long as the port 60 can receive pressurized fluid generated between seals 36, 38. Advantageously, during a cycle of operation, the piston 74 may advance in the fluid chamber 32 of the master cylinder assembly 26 in a generally upward direction with the output chamber 80 located in a relatively low point in the master cylinder assembly.

When the piston 74 creates the closed circuit position, i.e., when both first and second seals 36, 38 are engaged with respective first and second chamber portions 42, 44 of the fluid chamber 32, fluid in the second chamber portion 44 is advanced into the reservoir 40. The movement of fluid into (and out of) the reservoir 40 tends to displace the bladder 84. Air above the bladder 84 may be vented to atmosphere through the second cover 31 to permit movement of the bladder as a result of the change of volume of fluid in the reservoir 40.

The piston assembly 34 also includes a return spring 86, which may be disposed in the fluid chamber 32 between the housing body 27 and the piston 74 and functions to return the piston 74 and lever 30 to a start position generally corresponding to the open circuit position. A plate 88 is attached to the housing body 27 to close the first chamber portion 42 of the fluid chamber 32, retain the piston assembly 34 within the fluid pressure chamber, and provide access to the piston 74 via a plate hole 90.

A pushrod 92 may be disposed in the plate hole 90 and acts upon the piston assembly 34 via the lever 30. The pushrod 92 may include a threaded portion 96 proximate one end and a head 94 proximate the other end. The head 94 may include a rounded surface 112, which is received in a corresponding cup surface 114 in the piston 74. The threaded portion 96 of the pushrod 92 is threadably received in cross dowel 98.

The dowel 98 may be pivotally disposed with a bushing 100. The lever 30 pivotally receives the bushing 100 and dowel 98. The pushrod 92 passes through the dowel 98. The pushrod 92 may include a hex opening 116 for receiving an Allen wrench for adjusting the position of the lever 30, or reach, relative to a handlebar (not shown) by threaded engagement with the dowel 98.

The lever 30 is pivotally attached to the housing body 27 by way of a pivot assembly 104. The pivot assembly 104 may include a shaft 106. The ends of the shaft 106 may include bushings 108 that enable movement between the lever 30 and the housing body 27. Clips 110 may be affixed to the shaft 106 to retain the pivot assembly 104 on the housing body 27.

Figure 13:
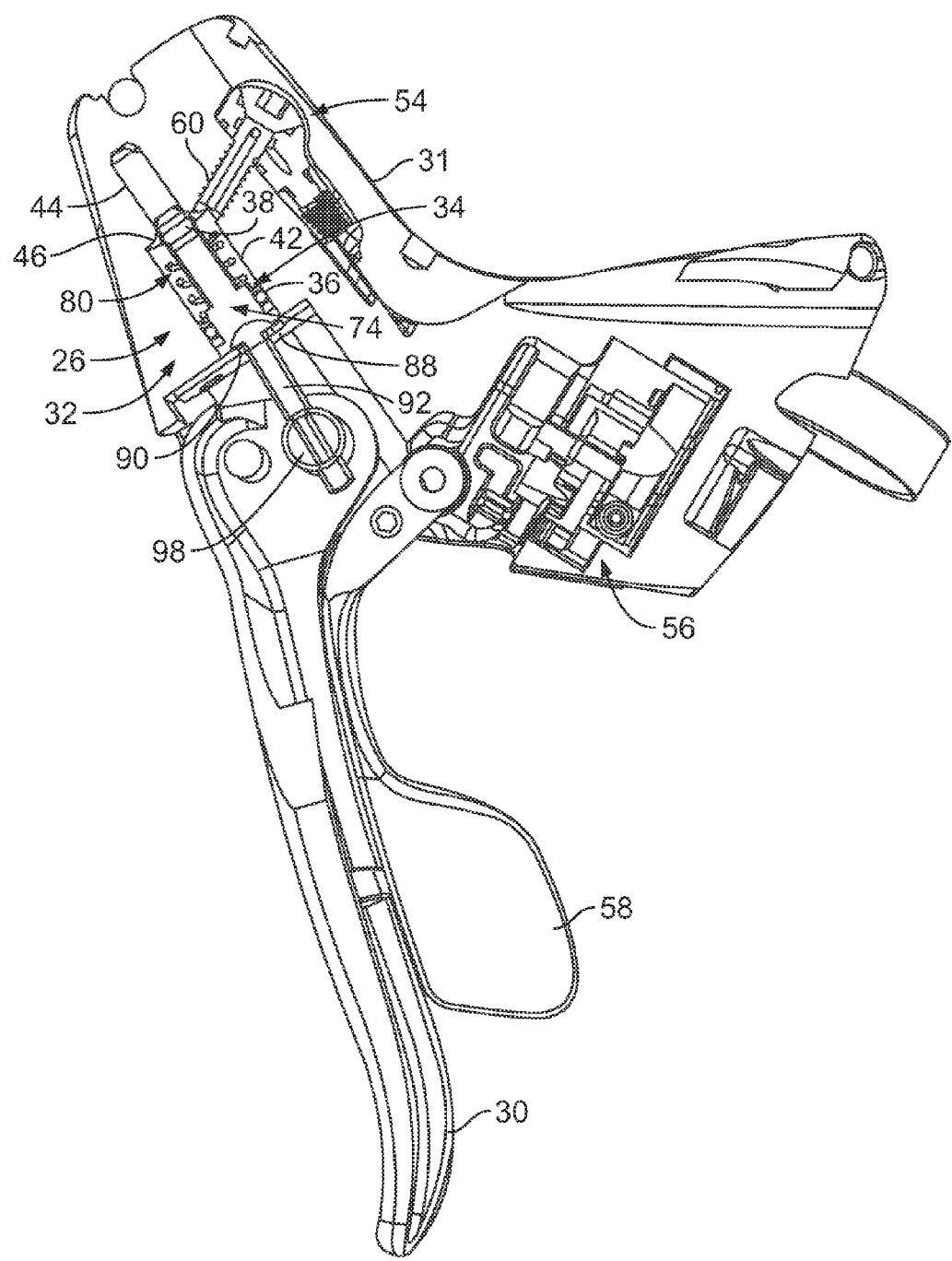
FIGS. 13-15 are side sectional views showing the brake actuation mechanism in use showing an initial travel, at-rest condition (FIG. 13), a fully actuated or full travel condition (FIG. 15), and an intermediate condition between the at rest and the full travel condition (FIG. 14)
Figure 14:
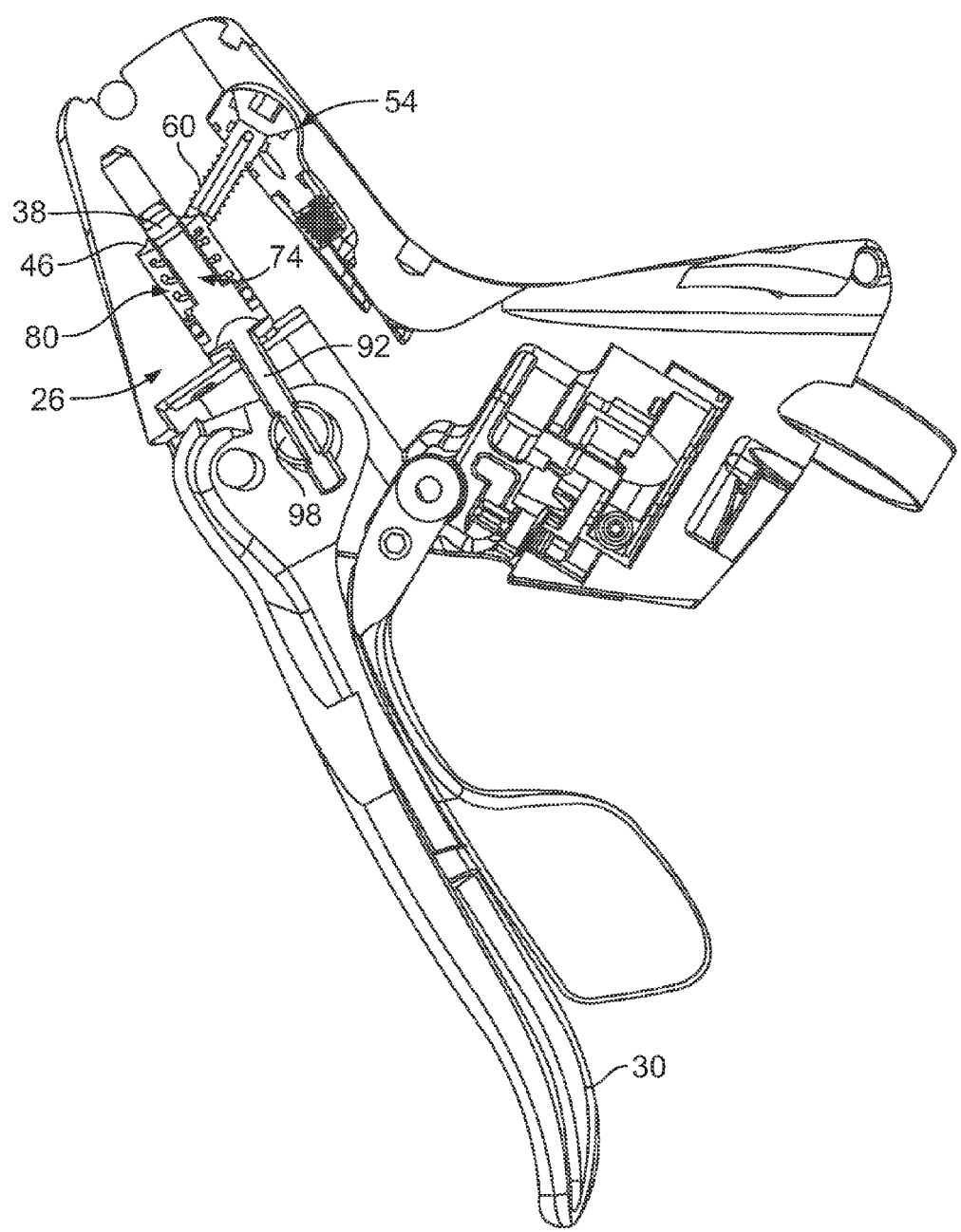
Figure 15:
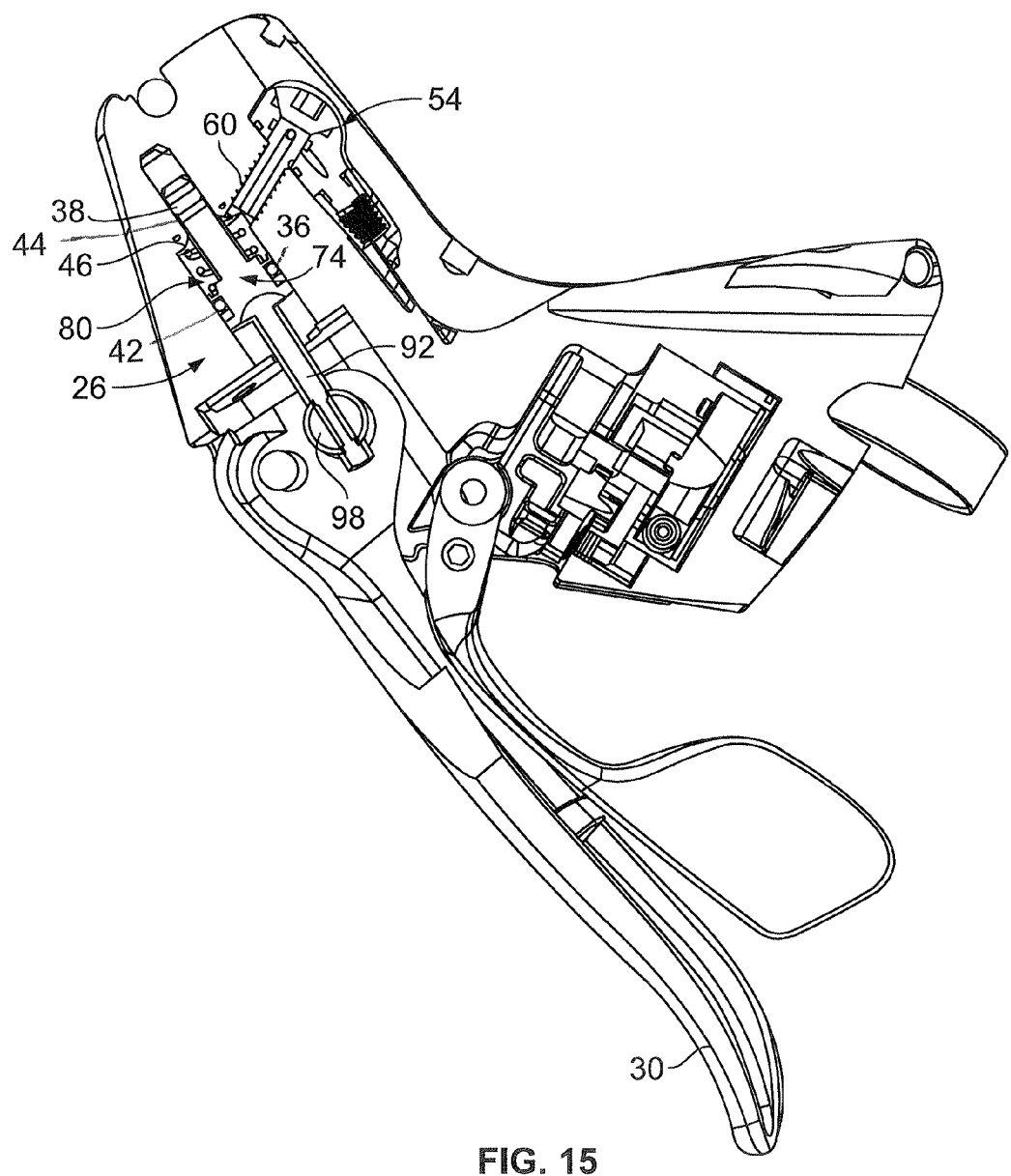

Referring to FIGS. 13-15 in particular, a typical cycle of operation includes a hand brake application to push brake pads against a brake rotor (not shown) or rim. The brake lever blade 30 is depressed by hand. This pushes the pushrod 92 to advance the piston 74. The lever blade 30 starting position may be changed with the adjustment of the pushrod 92 in the dowel 98. The piston 74 includes the first seal 36, which is the larger seal that always seals fluid from the atmosphere, and a second seal 38 that is not in sealing engagement when the lever blade is not depressed (FIG. 13), which represents an initial travel, at-rest condition.

Within the reservoir 40, a flexible bladder 84 makes a barrier between the fluid and atmosphere (FIG. 8). As the piston 74 is advanced, the first seal 36 continues to seal fluid from atmosphere and the second seal 38 becomes engaged with the fluid chamber 32 in the vicinity of the transition region 46 to create the closed circuit condition or intermediate condition (FIG. 14). When the second seal 38 becomes engaged, it creates a seal between the reservoir 40 and forms the output chamber 80.

The output chamber 80 and port 60 include a volume of fluid. The output chamber 80 is connected to a fitting 54 that is connected to a remote brake caliper (not shown). As the lever blade 30 is depressed further (FIG. 15), pressure increases in the output chamber 80, fluid is moved through the fitting 54, typically through a hydraulic line 28 (FIG. 8), and into the brake caliper.

As is well known, a pressure increase in the brake caliper causes the caliper pistons to advance and brake pads are urged against a brake rotor to create braking forces. If used with hydraulic rim brakes, the pressure increase causes the hydraulic rim brakes to engage a bicycle rim. When the lever blade 30 is released, the piston 74 returns to its "at rest" position, at least through action of the return spring 86, the pressure in the system decreases, and the caliper pistons/brake pads retract from the rotor/rim and brake forces decrease. The second seal 38 finally becomes disengaged from the wall of the fluid chamber 32 creating the open circuit condition.

FIGS. 16a-16e are diagrams of fluid pressure chambers 32 with outlet ports 60 shown in positions corresponding to several different embodiments of the invention. Each of FIGS. 16a-16e include fluid chambers 32 with first chamber portion 42 and second chamber portion 44 with a transition region 46 positioned therebetween as noted in the examples shown in FIGS. 1-15. The second chamber portion 44 has a distal end 48 and an end opposite the distal end, which will be referred to as the proximate end 120, adjacent the transition region.

Figure 16A:
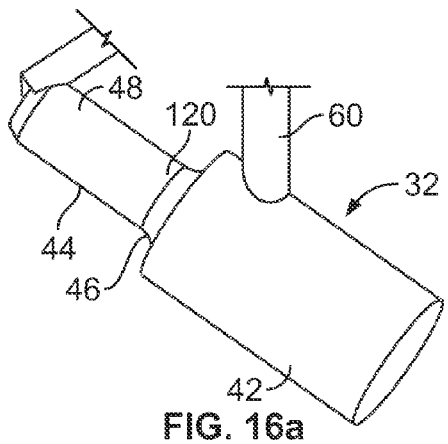
FIGS. 16a-16e are diagrams of a fluid chamber and outlet port according to several different embodiments.
Figure 16B:
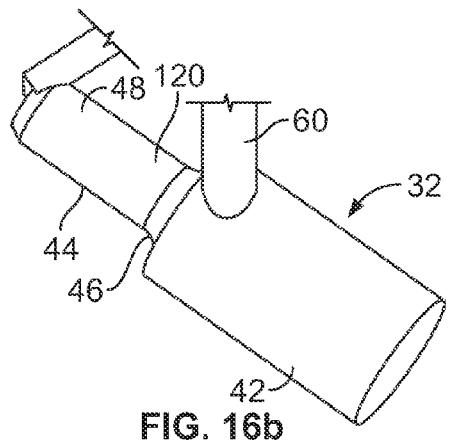
Figure 16C:
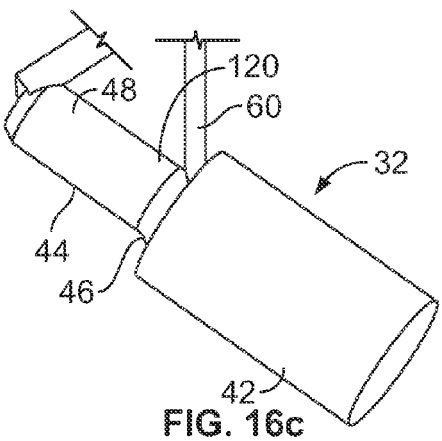
Figure 16D:
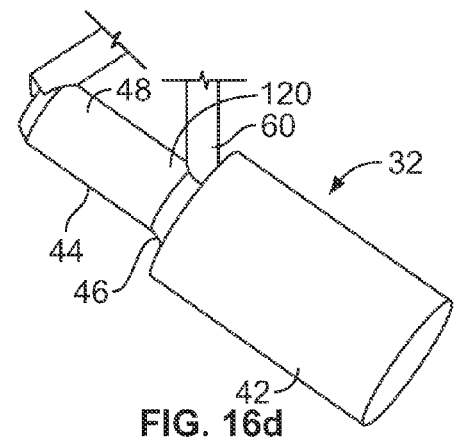
Figure 16E:
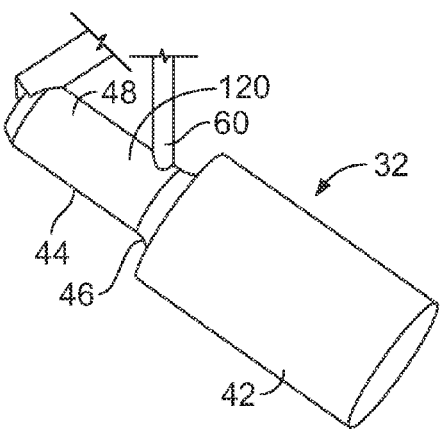

FIG. 16a shows the outlet port 60 extending from the first chamber portion 42 near the transition region 46. FIG. 16b shows the outlet port 60 extending from both the first chamber portion 42 and the transition region 46. FIG. 16c shows the outlet port 60 extending from the transition region 46. FIG. 16c shows the outlet port 60 extending from the second chamber portion 42 and the transition region 46. FIG. 16e shows the outlet port 60 extending from the second chamber portion 42 at the proximate end 120, near the transition region 46.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A hydraulic brake mechanism mountable to a handlebar, the brake mechanism comprising:
   a housing mountable to the handlebar; and
   a master cylinder assembly disposed within the housing, the master cylinder assembly including;
   a fluid chamber, comprising:
     a first chamber portion having a first diameter,
     a second chamber portion having a second diameter, the first diameter greater than the second diameter, and
     a transition region between the first and second chamber portions;
   a piston assembly, comprising:
     a piston slidably disposed within the fluid chamber,
     a first seal configured to sealingly engage between the first chamber portion and the piston, and
     a second seal configured to sealingly engage between the second chamber portion and the piston;
   an outlet port extending from the fluid chamber from at least one of the transition region, the first chamber portion and a proximate portion of the second chamber portion; and
   an actuator operatively connected to the housing and configured to slidably displace the piston assembly in the fluid chamber.

2. A hydraulic brake mechanism according to claim 1, wherein the outlet port extends from the transition region.

3. A hydraulic brake mechanism according to claim 1, wherein the outlet port is substantially vertically oriented within the housing, with the housing mounted to the handlebar.

4. A hydraulic brake mechanism according to claim 1, the fluid chamber including an output chamber defined between the first seal and the second seal, when the first seal is sealingly engaged between the piston and the first chamber portion and the second seal is sealingly engaged between the piston and the second chamber portion.

5. A hydraulic brake mechanism according to claim 4, wherein the outlet port extends from the output chamber.

6. A hydraulic brake mechanism according to claim 1, further comprising a reservoir disposed in the housing, the reservoir in fluid communication with the second chamber portion.

7. A hydraulic brake mechanism according to claim 6, wherein the reservoir is disposed laterally adjacent the fluid chamber, with the housing mounted to the handlebar.

8. A hydraulic brake mechanism according to claim 7, wherein the reservoir extends above and below the fluid chamber.

9. A hydraulic brake mechanism according to claim 6, further comprising a bladder that is attached to the housing and seals the reservoir.

10. A hydraulic brake mechanism according to claim 9, wherein the housing includes a top surface to which the bladder is attached.

11. A hydraulic brake mechanism according to claim 1, wherein the housing includes a single-piece housing body.

12. A hydraulic brake mechanism according to claim 11, wherein the housing includes a first panel attachable to the housing body.

13. A hydraulic brake mechanism according to claim 12, wherein the housing body includes a side surface and wherein the first panel is attachable to the side surface of the housing body.

14. A hydraulic brake mechanism according to claim 13, wherein the housing includes a second panel attachable to the housing body.

15. A hydraulic brake mechanism according to claim 14, wherein the housing body includes a top surface and wherein the second panel is attachable to the top surface of the housing body.

16. A hydraulic brake mechanism according to claim 14, further comprising a hood cover configured to fit over the assembled housing body, the first panel, and the second panel.

17. A hydraulic brake mechanism according to claim 1, further comprising a fluid fitting assembly connected to and in fluid communication with the outlet port.

18. A hydraulic brake mechanism according to claim 17, wherein the fluid fitting assembly includes a hollow bolt connected to and in fluid communication with the outlet port and a banjo fitting disposed about and in fluid communication with the hollow bolt.

19. A hydraulic brake mechanism according to claim 18, including a hydraulic line connected to and in fluid communication with the fluid fitting assembly and wherein the housing body comprises a side surface and a top surface, and wherein the hydraulic line extends from the fluid fitting assembly and along at least one of the side surface and the top surface of the housing body.

20. A hydraulic brake mechanism according to claim 19, wherein the housing body comprises a recess in which the hydraulic line is disposed.

21. A hydraulic brake mechanism according to claim 20, wherein the housing includes a first panel attachable to the side surface of the housing body covering at least a part of the recess and enclosing part of the hydraulic line within the recess.

22. A hydraulic brake mechanism according to claim 21, wherein the housing includes a second panel attachable to the top surface of the housing body covering at least a part of the recess and enclosing part of the hydraulic line.

23. A hydraulic brake mechanism according to claim 1, wherein the housing comprises a base portion.

24. A hydraulic brake mechanism according to claim 23, wherein the base portion comprises a clamp for clamping the housing to the handlebar.

25. A hydraulic brake mechanism according to claim 23, further comprising a gear shift mechanism disposed within the base portion.

26. A hydraulic brake mechanism according to claim 23, wherein the housing comprises an extension portion extending from the base portion, the master cylinder disposed within the extension portion.

27. A hydraulic brake mechanism according to claim 26, wherein the outlet port is substantially vertically oriented within the extension portion of the housing, with the housing mounted to the handlebar.

28. A hydraulic brake mechanism according to claim 27, further comprising a fluid fitting assembly connected to the outlet port.

29. A hydraulic brake mechanism according to claim 28, wherein the housing body includes a top surface and wherein the fluid fitting assembly is disposed along the top surface.

* * * * *